United States Patent
Tayar

(10) Patent No.: US 8,672,202 B2
(45) Date of Patent: Mar. 18, 2014

(54) SYSTEM AND METHOD FOR CARRYING LOADS

(76) Inventor: Eliahu Tayar, Moshav Ramat Tzvi (IL)

(*) Notice: Subject to any disclaimer, the term of this patent is extended or adjusted under 35 U.S.C. 154(b) by 38 days.

(21) Appl. No.: 13/115,384

(22) Filed: May 25, 2011

(65) Prior Publication Data

US 2012/0067932 A1  Mar. 22, 2012

Related U.S. Application Data

(63) Continuation-in-part of application No. PCT/IL2010/000971, filed on Nov. 18, 2010.

(60) Provisional application No. 61/262,597, filed on Nov. 19, 2009.

(51) Int. Cl.
- A45F 3/14 (2006.01)
- A45F 4/02 (2006.01)
- B62D 51/04 (2006.01)

(52) U.S. Cl.
USPC ............. 224/627; 224/184; 224/153; 280/1.5

(58) Field of Classification Search
USPC ........... 224/627, 184, 153, 643, 642; 280/1.5
See application file for complete search history.

(56) References Cited

U.S. PATENT DOCUMENTS

| | | | | |
|---|---|---|---|---|
| 2,613,953 A | * | 10/1952 | Giovannoni | 280/1.5 |
| 3,550,997 A | * | 12/1970 | Strand | 280/30 |
| 3,826,323 A | | 7/1974 | Mehne | |
| 4,045,040 A | * | 8/1977 | Fails | 280/1.5 |
| 4,637,536 A | | 1/1987 | Wong | |
| 4,664,395 A | * | 5/1987 | McCoy | 280/1.5 |
| 4,838,565 A | * | 6/1989 | Douglas et al. | 280/1.5 |
| 5,005,844 A | * | 4/1991 | Douglas et al. | 280/1.5 |
| 5,044,468 A | | 9/1991 | Worthington, Jr. | |
| 5,385,355 A | * | 1/1995 | Hoffman | 280/1.5 |
| 5,769,431 A | * | 6/1998 | Cordova | 280/1.5 |
| 5,901,968 A | | 5/1999 | Niedersteiner | |
| 6,139,033 A | * | 10/2000 | Western | 280/47.23 |

(Continued)

FOREIGN PATENT DOCUMENTS

| | | | | |
|---|---|---|---|---|
| DE | 3918346 | | 12/1990 | |
| DE | 3918346 A1 | * | 12/1990 | A45F 3/08 |
| WO | WO2012/153334 A1 | * | 11/2012 | A45F 3/08 |

OTHER PUBLICATIONS

International Search Report of PCT Application No. PCT/IL2010/000971 mailed on Mar. 15, 2011.

(Continued)

Primary Examiner — Justin Larson
Assistant Examiner — Lester L Vanterpool
(74) Attorney, Agent, or Firm — Pearl Cohen Zedek Latzer Baratz LLP

(57) ABSTRACT

System and method for carrying loads by a user are disclosed. According to embodiments of this invention a load is carried attached to the back of the user and concurrently vertically supported to the ground on supporting means. The system comprising means that allow vertical free movements of the load with respect to the user's back within a defined range so that the load substantially carried by the supporting means while providing stable attachment of the load to the user's back in two other linear axes of freedom and in all three circular axes of freedom. The supporting means includes means to adjust the support according to the user's height and to the grounds bumpiness.

23 Claims, 18 Drawing Sheets

(56) References Cited

U.S. PATENT DOCUMENTS

| | | |
|---|---|---|
| 6,464,118 B2 | 10/2002 | McUmber |
| 6,631,777 B1 * | 10/2003 | Thompson ............... 180/180 |
| 7,484,737 B2 * | 2/2009 | Satorius ................... 280/1.5 |
| 2005/0272572 A1 | 12/2005 | Lewis |
| 2006/0237918 A1 * | 10/2006 | Satorius ................... 280/1.5 |
| 2006/0240960 A1 * | 10/2006 | Shahinpoor ............. 482/121 |
| 2007/0075105 A1 * | 4/2007 | Petrin ...................... 224/153 |
| 2008/0174078 A1 * | 7/2008 | Dooley ..................... 280/1.5 |
| 2009/0079144 A1 * | 3/2009 | Satorius ................... 280/1.5 |
| 2010/0051657 A1 * | 3/2010 | Onessimo et al. ........ 224/153 |
| 2012/0067932 A1 * | 3/2012 | Tayar ....................... 224/261 |

OTHER PUBLICATIONS

International Search Report of PCT Application No. PCT/IL2012/050164 mailed on Oct. 1, 2012.

Supplementary Partial European Search Report of Application No. EP 10 83 1257 mailed on Oct. 23, 2013.

* cited by examiner

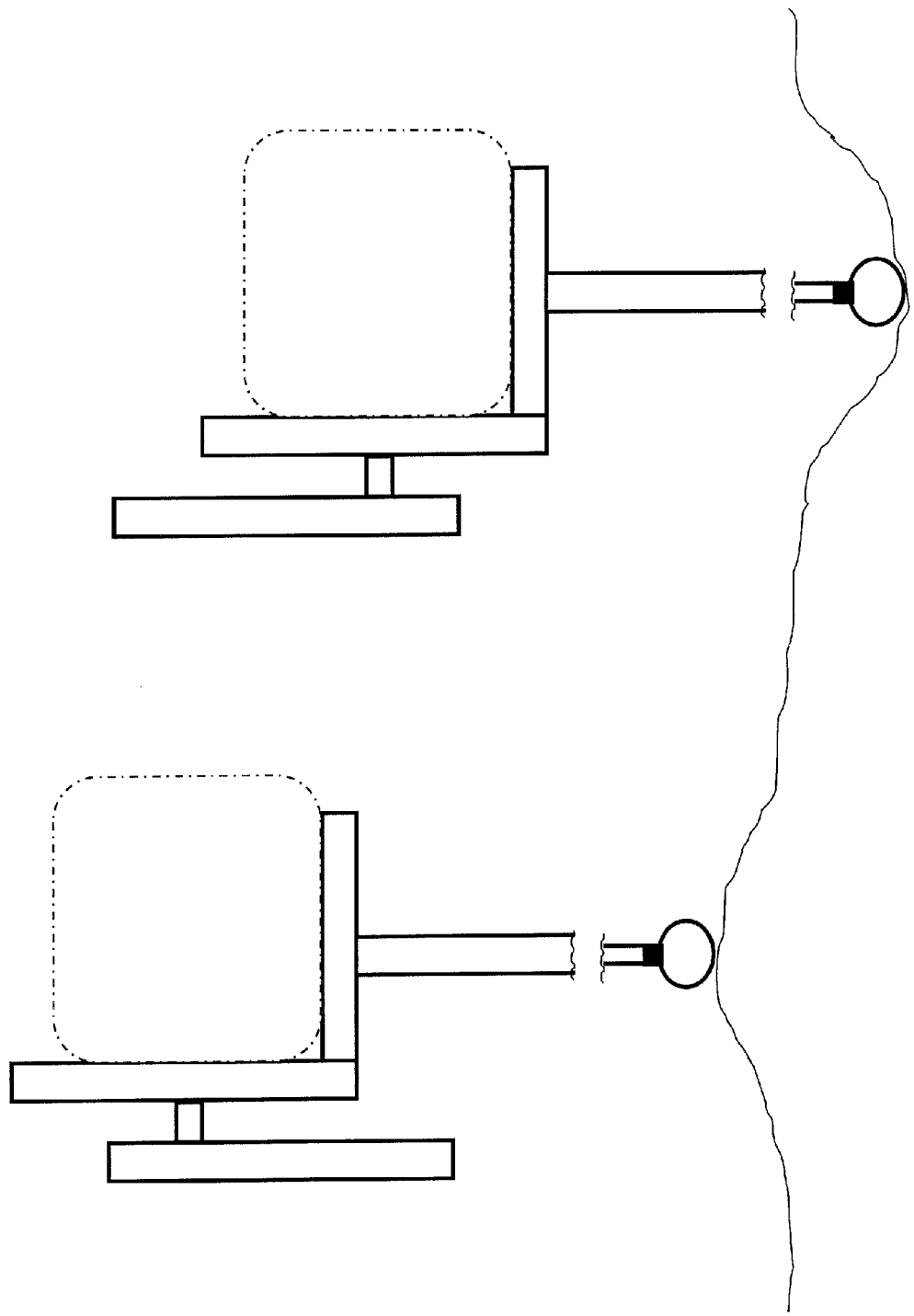

SYSTEM AND METHOD FOR CARRYING LOADS

CROSS REFERENCE TO RELATED APPLICATIONS

This application is a continuation-in-part of International Patent Application No. PCT/IL2010/000971, international filing date Nov. 18, 2010, which claimed the benefit of U.S. Provisional Patent Application No. 61/262,597, filed Nov. 19, 2009, both of which are incorporated herein in their entireties.

BACKGROUND OF THE INVENTION

Nowadays equipment for carrying loads by human allow carrying relatively heavy loads with rather comfort thus allowing carrying such loads for long ranges and long time without over exhausting the human carrying the load. Typically the equipment allowing carrying heavier loads for longer ranges and time puts most of the load weight on the shoulders of the carrying human, with many types of means for softening and cushioning the contact of the load with the body, with means for transferring some of the load to other organs of the body such as hardened light-weight frame, and the like. A typical solution as known in the art is a modern backpack such as the one presented in FIG. 1.

In other known solutions a cumbersome, bulky or instable carriage is disclosed which is pulled by the user or otherwise semi-hanging on the user. Such solutions are typically not easy to use on tough terrain and are easy to turn around when used on a sideways inclined terrain. Yet, in all prior art solutions for carrying loads by human either the full weight of the load (or most of it) is carried directly by the human's body and the full load leans on the human's skeleton or is carried on an instable and bulky device connected to the user. Such bulky and instable prior art solutions dramatically limit the ability of the user to walk through tough terrains. This limits the maximum weight that a user can carry and the time and distance he or she may carry heavy load, while inducing long-term strains into the human's skeleton with possible heavy long range damages. Other known solutions limit the types of terrains in which the user may operate with heavy loads.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1C and 1D schematically illustrate the system shown in FIG. 1B, in two working positions thereof;

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

According to embodiments of the present invention a system is disclosed that may provide support from the ground to a load that a user needs to carry and concurrently may provides high flexibility for walking through various types of terrain, such as sandy terrain, rocky terrain, sideways inclined terrain and any combination thereof. According to embodiments of the present invention a system adapted for carrying loads is disclosed that may provide support to the carried load so that substantially most of the load may be supported via the system by the ground. The system may be further adapted to be substantially unaffected by sideways inclination of the ground by providing contact area with the ground which is as narrow as possible as measured along a line that is parallel to the ground and is substantially perpendicular to the direction of walking of the user. The system is further adapted to provide dynamic adaptation of the supporting mechanism to variations in the height of the surface of the ground along the user's trail, such as bumpy or rugged ground, so that the user may proceed walking with minimal effect of that ground.

Figure 1:
FIG. 1 is a picture of a backpack as known in the art.
Figure 1A:
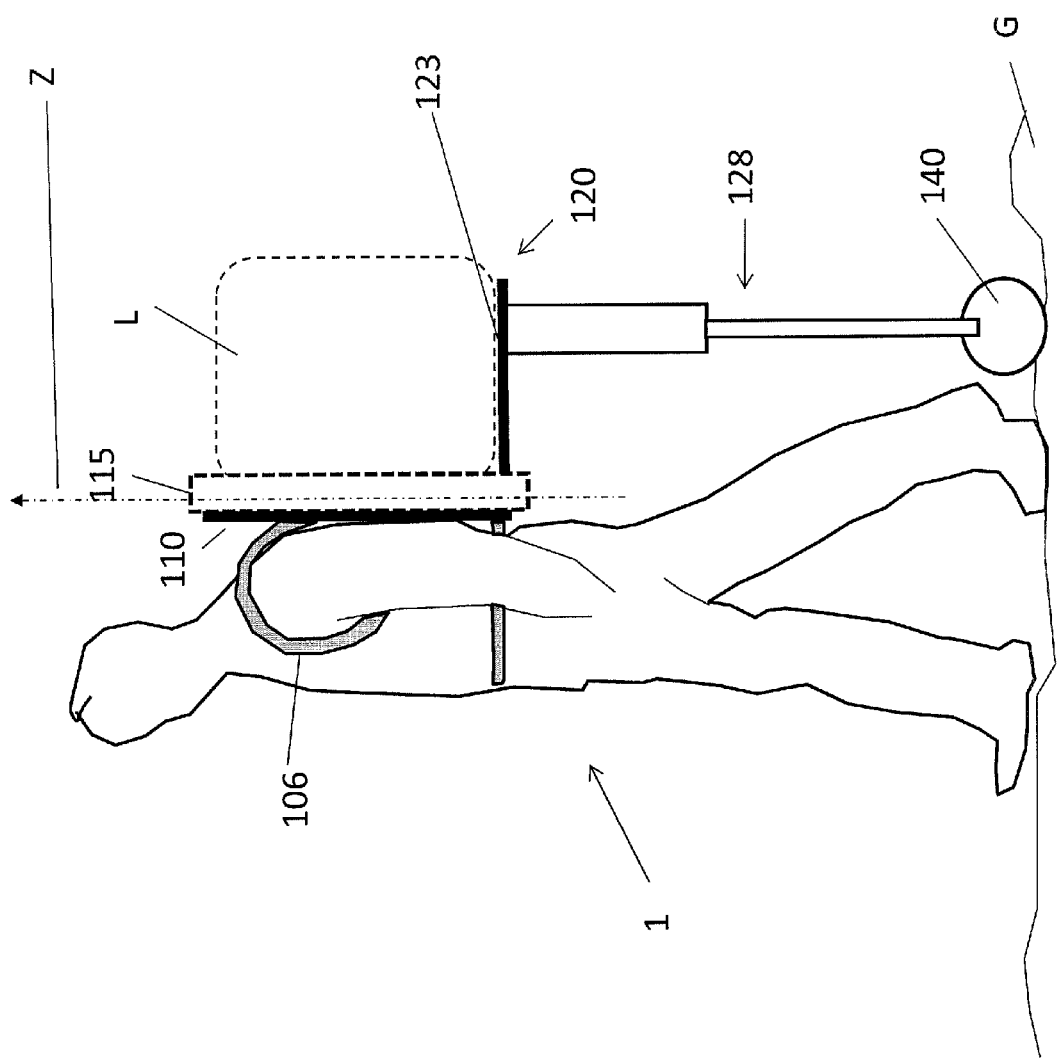
FIG. 1A is a schematic general illustration of a side view of a system for carrying loads, according to the presently disclosed subject matter, when worn by a user.

With reference to FIG. 1A, there is schematically illustrated a user walking on the ground G and wearing a system 1 for carrying loads according to a general example of the presently disclosed subject matter. The system 1 comprises a harness 106 worn by a user, a harness back frame 110 attached to the harness 106 so as to be oriented generally along a vertical axis Z associated with the back frame 110, a load base 120 with a base portion 123 configured for carrying a load L thereon (shown in dashed line for illustration purpose only), a connecting means 115 for connecting the base portion 123 to the back frame 110 so as to allow with respect thereto free movement of the base portion parallel to itself along the axis Z between a raised position to which the base portion is brought if an upward force is applied thereto from below, and a lowered position taken by the load base under the influence of gravity.

The system 1 further comprises a load support 128 configured to provide vertical support to the base portion 123 and to move along the vertical axis in response to the topography of the ground, applying thereby upward force to the load base 123 and causing it to perform the above mentioned movement with respect to the base frame 110. The system 1 also comprises a gliding means 140 connected to the load support 128 and adapted for gliding when in touch with the ground G.

Figure 1B:
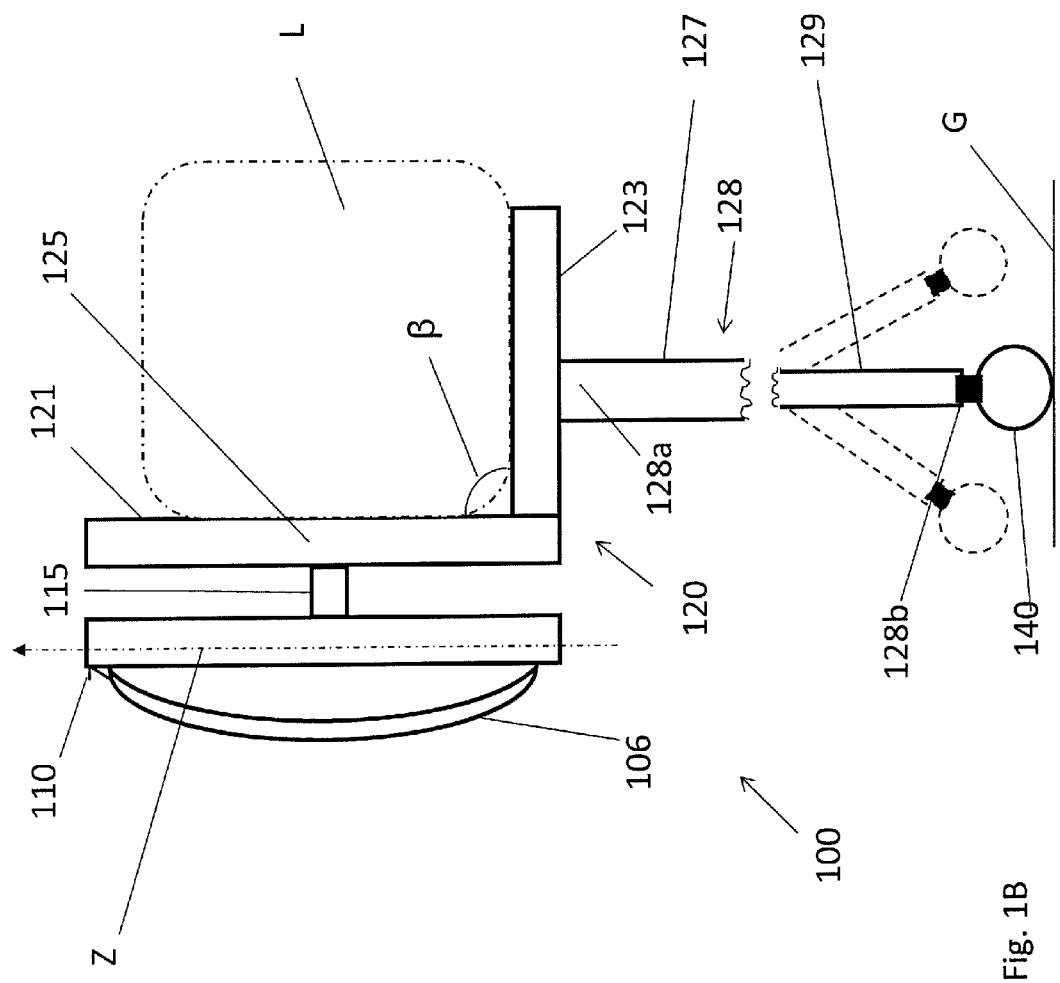
FIG. 1B is an schematic enlarged side view of a system for carrying loads according to a specific example of the presently disclosed subject matter.

FIGS. 1B to 1D schematically illustrate a system 100 in its enlarged side view, which is similar to the system 1 in FIG. 1A and in which the load base 120 comprises, in addition to the base portion 123, a side portion 121 extending generally along the axis Z, to which the base portion 123 is fixed to form an integral body or with which it is formed as a unitary body. As shown, the base portion 123 can be so located relative to the side portion 121 that at least a majority 125 of the side portion 121 is disposed above the base portion 123. The mutual orientation of the two portions can be such that an angle β between the base portion 123 and the part 125 of the side portion 121 does not exceed 90 deg. As seen, the side portion 121 can be parallel to the back frame 110, and the base portion can be oriented perpendicular to both of them.

The system 100 further comprises means 115 for connecting the side portion 121 to the back frame 110 so as to allow free movement with respect thereto of the load base 120 parallel to itself along the axis Z. The load base 120 is configured to perform the movement between a raised position shown in FIG. 1C and a lowered position shown in FIG. 1D. In at least one of maximally raised (uppermost) or maximally lowered (lowermost) positions and/or any position therebetween, the part 125 of the side portion 121 extends along at least a majority of the back frame 110 (as seen in FIGS. 4A to 4D illustrating the use of a system according to another, more specific example of the presently disclosed subject matter).

The system 100 further comprises a load support 128 having an upper end 128a connected to the base portion 123 and an opposite lower end 128b, and configured to provide vertical support to the base portion 123 and, when moving along the vertical axis Z, to cause the load base 123 to move with respect to the back frame 110 along the axis Z. The system 100 also comprises a gliding means 140 connected to the lower end 128b of the load support 128 and adapted for gliding when in touch with the ground G.

As illustrated by dotted lines in FIG. 1B, the load support 128 can be configured for taking a number of states defined by different positions of at least the lower end of the load support 128 relative to the base portion 123 of the load base 120, wherein at least one of these states allows the load support 128 to provide the vertical support to the base portion 123, as explained above. For this to end, the load support 128 can have an upper portion 127 associated with its upper end 128a, and a lower portion 129 associated with its lower end 128b and movable with respect to the upper portion 127 to bring the load support 128 to its different states. These different states can be defined by different positions of the lower end 128b relative to the upper end 128a, and/or by different distances between the upper and lower ends of the load support, and/or by different distances of the lower end 128b from the vertical axis Z. The latter option is obtainable by configuring the movable portion 129 of the load support 128 so that it can take different angular positions relative to the upper portion 127 (as shown in FIG. 1B), at least one of these positions being vertical to provide the vertical support to the load base 120, as explained above.

Figure 6:
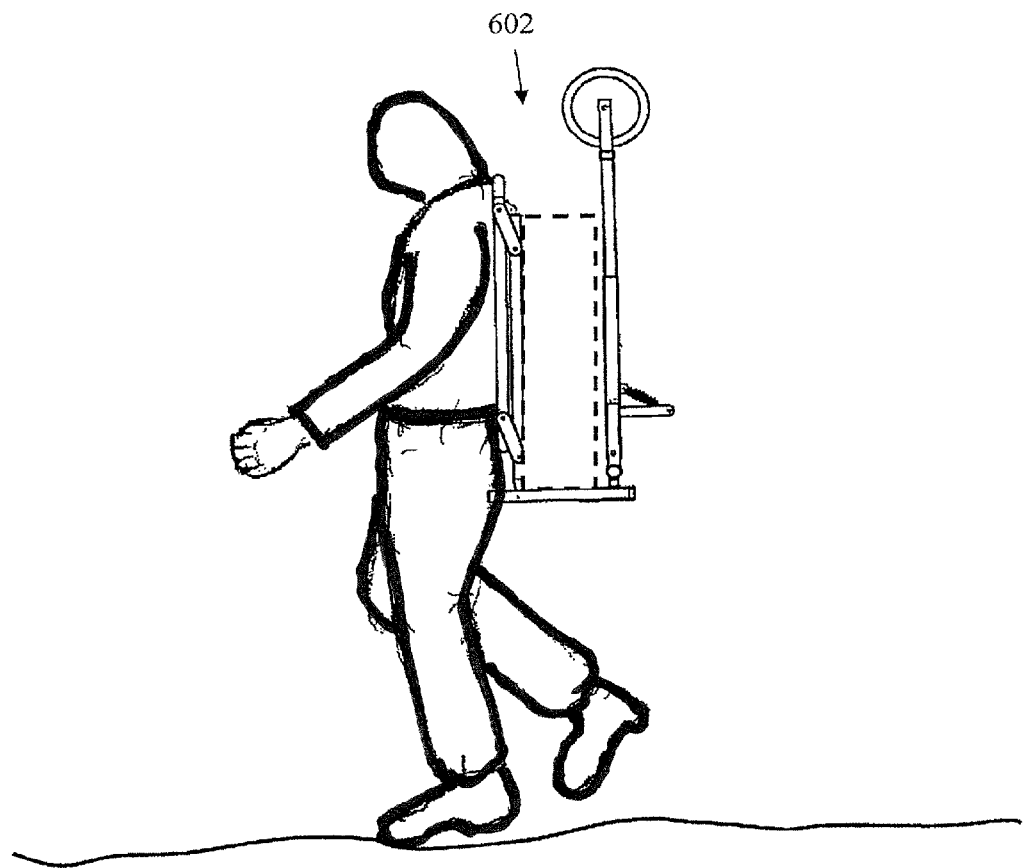
FIG. 6 presents a load carrying system according to embodiments of the present invention in its stowed/folded state.

In any case, the load support 128 can be configured for taking at least one working position in which it provides the vertical support to the load base 120 as explained above, and a non-working, stored position at which it is prevented from providing such support. In the latter, stored position, the load support can be configured to have, for example, one or more of the following orientations:

- the load support 128 can be disposed below the base portion of the load base 120 (not shown) and be oriented at such acute angle relative to the base portion 123, as to prevent the load support 128 from contacting the ground G;
- the load support 128 can be oriented perpendicular to the vertical axis Z and extend, from the base portion 123, backward (i.e. away from the back frame) or inwards (i.e. towards the back frame), or sideward (i.e. any intermediate orientation between the backward and inward orientations);
- the load support 128 can extend upwardly from the base portion 123 of the load base 120 (such as shown in FIG. 6); and
- the load support 128 can be detached from the base portion 123 with a possibility of being attached back thereto (not shown).

Furthermore, the load support can be foldable in order to be stored in its folded state as an alternative to the above options or in combination with any one or more of these options.

Figure 3:
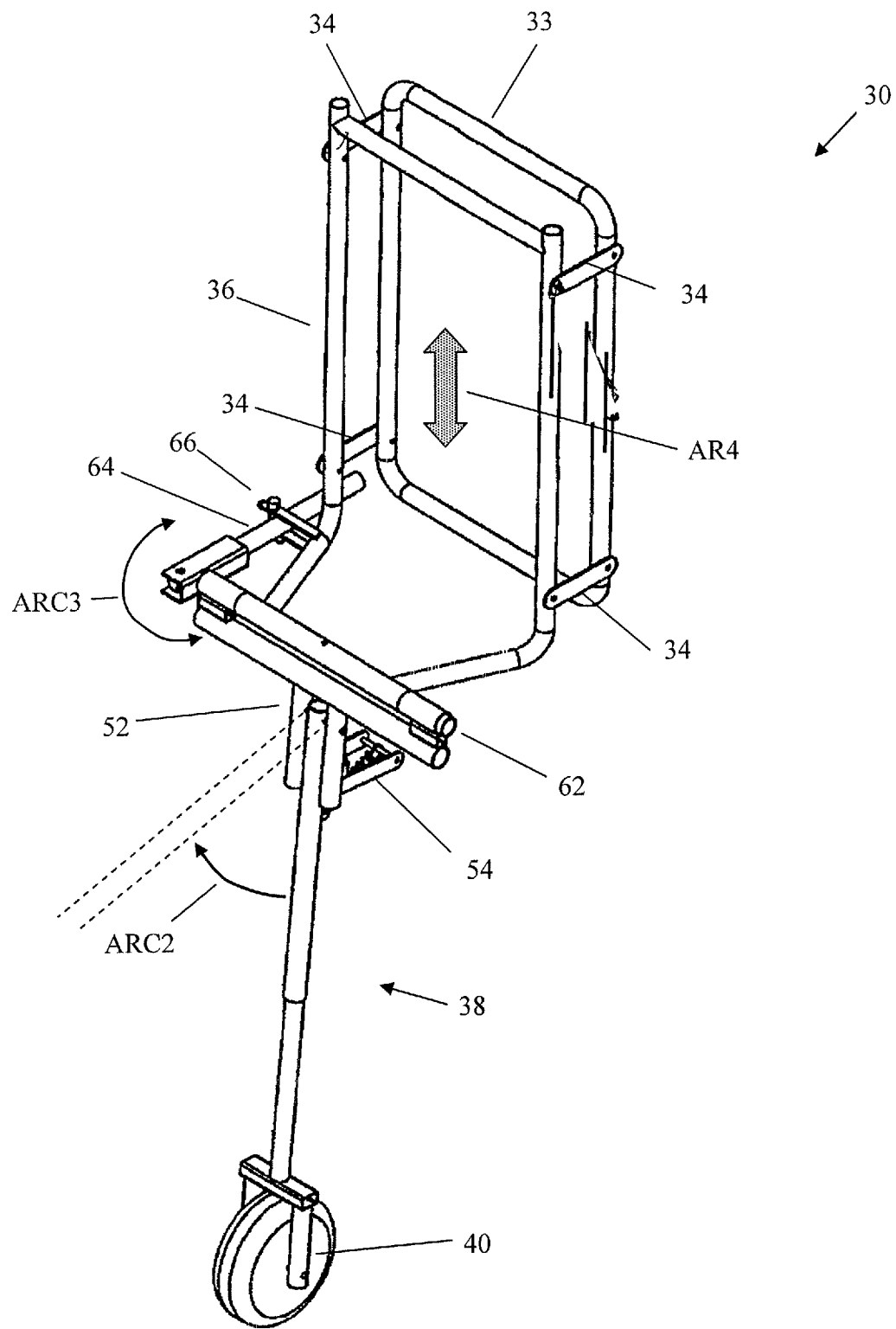
FIG. 3 is a schematic illustration of a system for carrying loads according to embodiments of the present invention.

The load base in the systems 1 and 100 can be of any suitable design, i.e. its base portion and its side portion, if any, can be made in the form of continuous plates or frame(s) including spaced apart rods defining the outline of the load base. The load base in the systems 1 and 100 can be, for example, in the form of an L-shaped frame as shown in FIG. 3.

The connecting means 115 of the systems 1 and 100 that are shown schematically in corresponding FIGS. 1A and 1B, can have any design known in the art, providing free movement of the load base relative to the back frame along the vertical 1 axis Z and preventing such movement in all other directions. In other words, the connecting means 115 provide the load base with only one, vertical degree of freedom. In addition, the connection means can be of the kind allowing the load base with its load support to be detachably attachable to the back frame, for use only when desired. Moreover, the backframe can be configured for detachably attaching thereto (when the load base is disconnected therefrom) different kinds of articles such as bags, enable the back frame's use for carrying such articles when the load base is not in use.

Figures 1E, 1G:
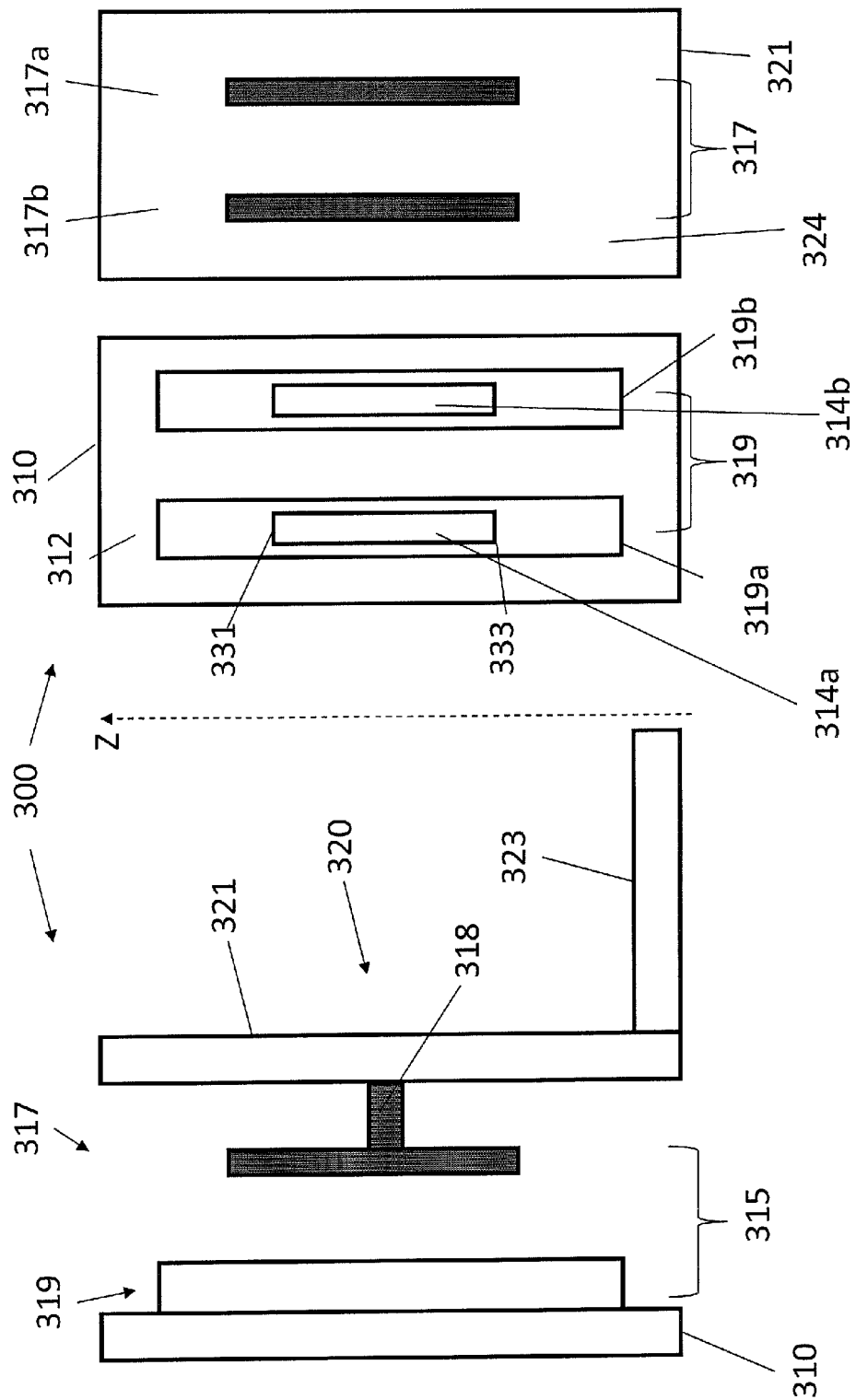
FIG. 1E and FIGS. 1F-1G schematically illustrate the system shown in FIG. 1B with different designs of connection means.
Figure 1F:
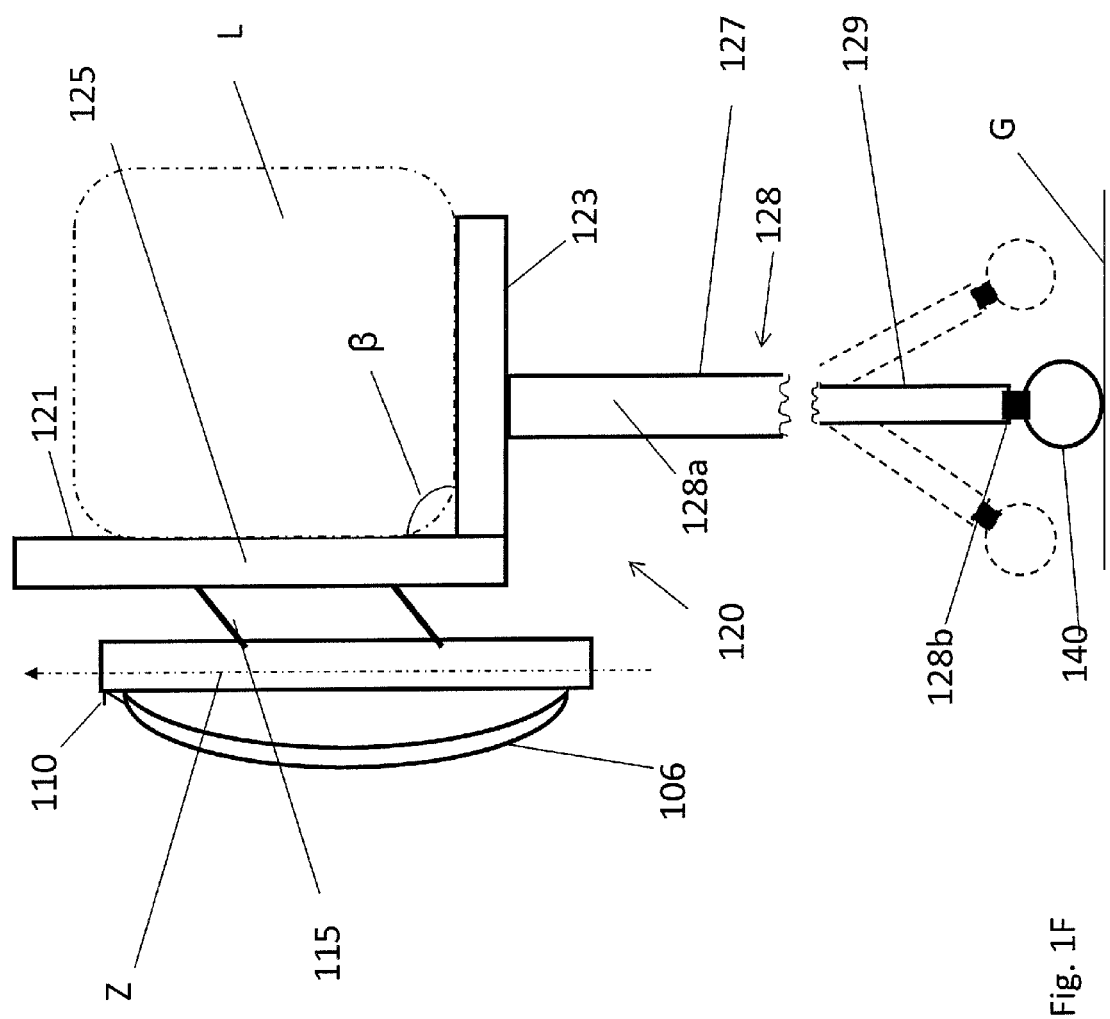

FIG. 1E and FIGS. 1F-1G show two optional designs of the connecting means 115. In particular, with reference to FIG. 1E, the connecting means 115 can be in the form of four hinged connectors 134 forming, together with the back frame 110 and with the side portion 121, a spatial parallelogram which allows free vertical motion of the load base with respect to back frame along the vertical axis Z.

With reference to FIGS. 1F and 1G, the connecting means can be in the form of a vertical-only free movement sliding arrangement 315 which is shown in these figures as used in a system 300 and which comprises a sliding device 317 fixedly attached or constituting an integral part of side portion 321 of the system 300, and protruding therefrom, and a receiving device 319 fixedly attached or constituting an integral part of back frame 310 of the system 300 and configured for receiving therein at least a portion of the sliding device 317 so as to allow its free movement therein along the Z axis. The sliding device 317 can be in the form of a pair of sliding elements 317a and 317b fixed to the side portion 321 at its face 324 facing the back frame 310 at least when in use, by means of fixing elements 318 (not seen), respectively. The receiving device 319 can be in the form of two hollow receiving members 319a and 319b fixed to the back frame 310, at a face 312 facing the side portion 321 at least when in use, and configured for slidingly receiving therein the sliding elements 317a and 317b, respectively. For this purpose, the receiving members 319a and 319b comprise two slots 314a and 314b through which the fixing elements 318 extend when the sliding elements 317a and 317b are received within the respective receiving members 319a and 319b.

Figure 2A:
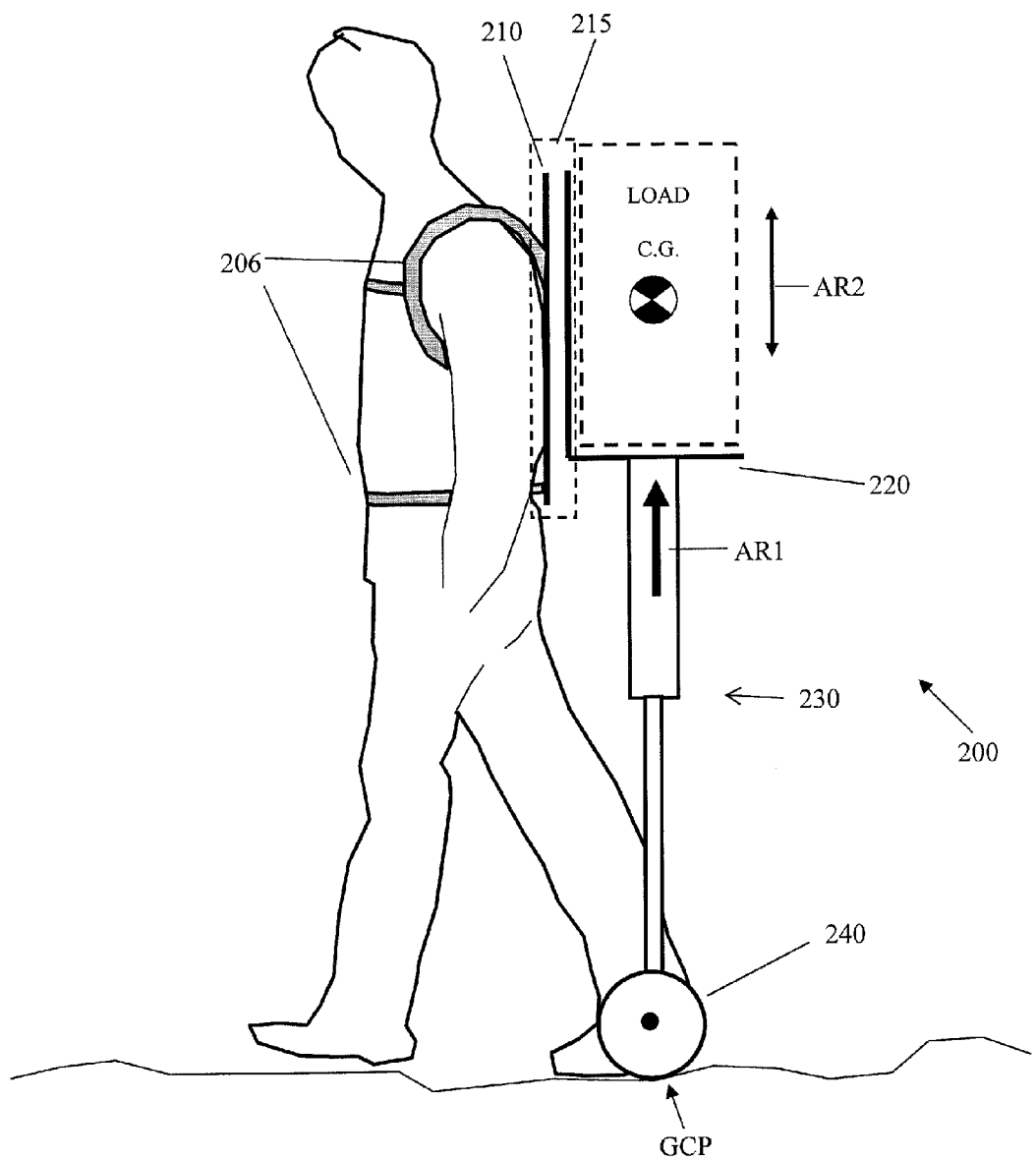
FIGS. 2A and 2B are schematic illustrations of a system for carrying loads shown in a side view and in an isometric view, respectively, according to embodiments of the present invention.
Figure 2B:
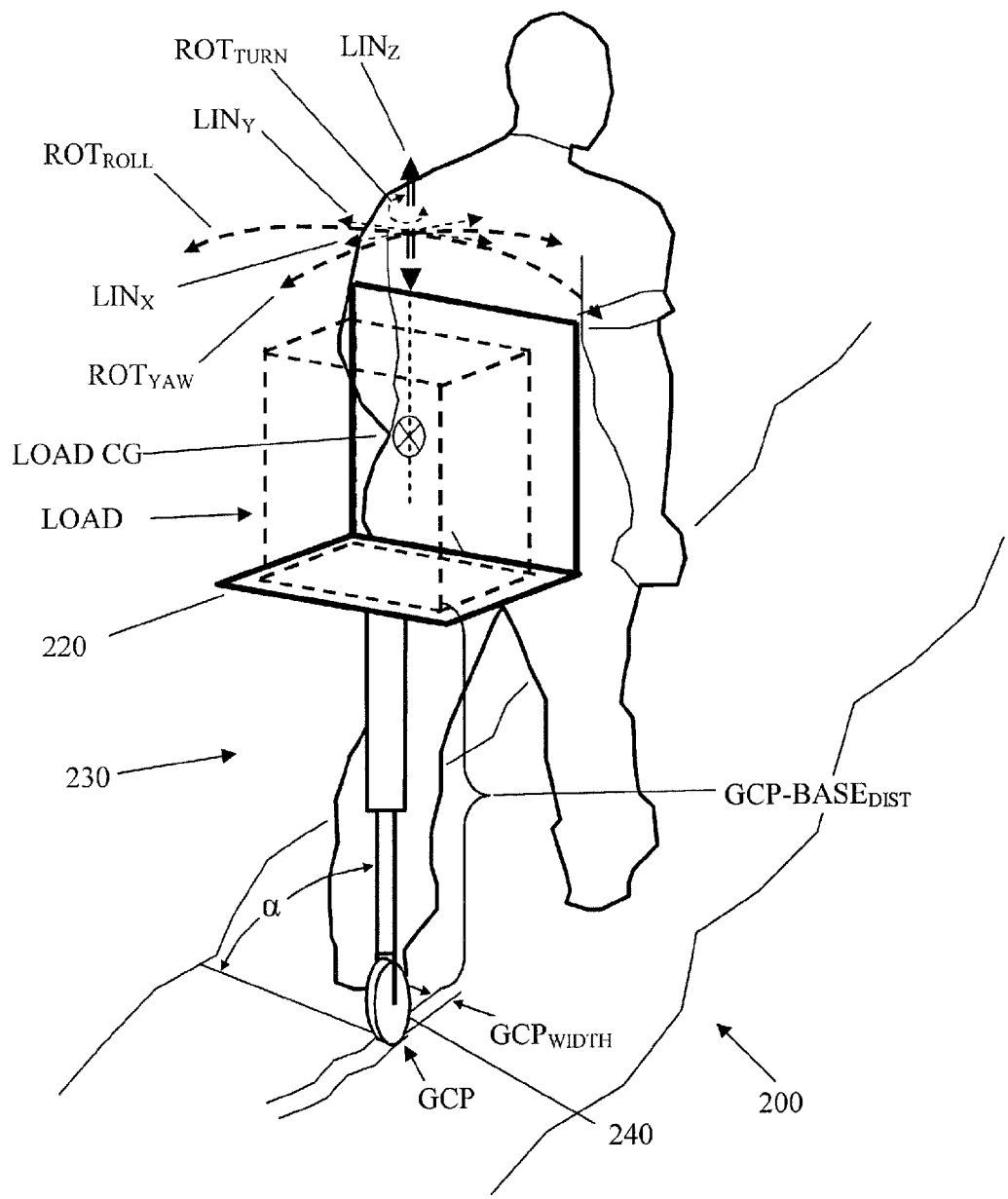
Figure 2C:
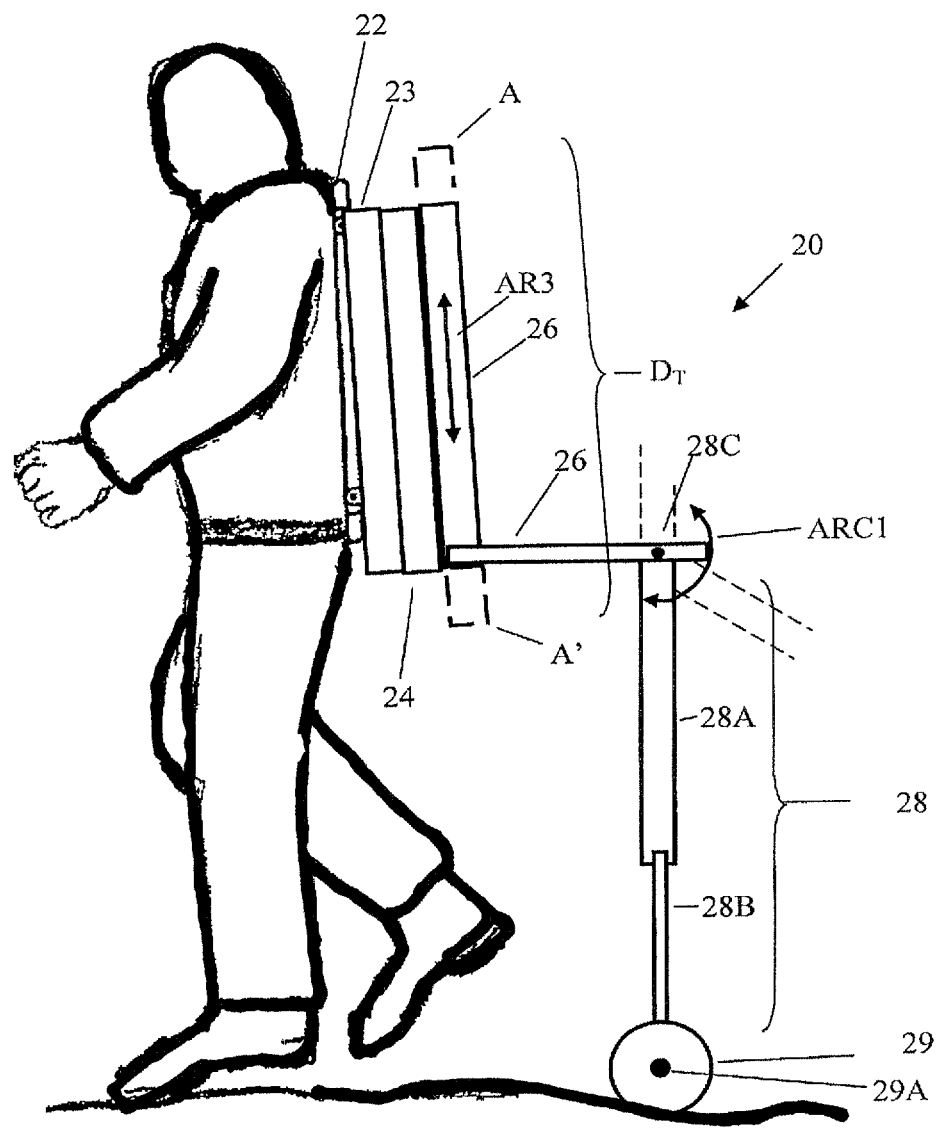
FIG. 2C is a schematic illustration of a system for carrying loads according to embodiments of the present invention.

The movement of the sliding device 317 within the receiving device 319 can be limited to provide a predetermined travel distance DT (shown in FIG. 2C). For this purpose limiting means, such as for example upper and lower stoppers can be provided.

The function of such stoppers can be fulfilled by upper and lower ends 331 and 333 of the slots 314a and 314b, which limit the movement of the movement of the sliding elements 317a and 317b and thereby the movement of the side portion 321 with respect to the back frame 310. Alternatively or additionally, the sliding elements 317a and 317b may be fitted with end stoppers 335 and 337 at their ends.

In the description below, further explanations are provided on the operation of systems according to the presently disclosed subject matter, and a number of optional features thereof, which are all fully applicable to the systems 1 and 100 described above.

Reference is made now to FIGS. 2A and 2B which are schematic illustrations of system 200 for carrying loads shown in a side view and in an isometric view, respectively, according to embodiments of the present invention. System 200 comprising back frame 210 adapted to be carried on a back of a user using harness 206 which may comprise one and preferably two shoulder straps or the like and, according to some embodiments of the present invention, may further comprise chest and belly securing straps. System 200 further comprising load base frame 220 adapted to receive loads and connected to back frame 210 via vertical-only-free movement connecting means 215, load base frame 220 may be supported from underneath (with respect to gravity direction) by support means 230 which is connected to load base frame 220 at its first end and to ground contact means 240 at its second end. Support means 230 is adapted to provide support from the ground to load base frame 220 in a direction which is, substantially, along its longitudinal axis, as indicated by arrow AR1, support means 230 may be connected to load base frame 220 so that the vector symbolizing its support force, AR1, points from underneath substantially through a reception space formed by load base frame 220 where a load may be placed so that AR1 may point also substantially through the center of gravity CG of that load. Thus, when support means 230 is substantially vertical and load is placed on it the center of gravity CG of the load may be substantially above the connecting point of support means 230 to load base frame 220. Support means 230 may be adapted to enable adaptation of system 200 for use by users with variety of heights, as will be described in details herein below. Ground contact means 240 may be adapted to provide smooth contact with the surface of the ground when the user steps forward, as will be described in details herein below.

System 200 is shown in FIG. 2B in isometric view from behind however the elements of harness 206, back frame 210 and vertical-only-free movement connecting means 215 were not drawn to improve the readability of the drawing. The load base frame 220 (together with any load placed on it and attached to it) may have, in principle, six degrees of freedom to move in a reference framework (e.g. a framework that its vertical axis is aligned with the vertical axis of the globe coordinates, its X axis is aligned with the direction of movement of the user and its Y axis is vertical to the latter two axes. When the load is secured to load base frame 220 is supported via support means 230 and ground contact means 240 by the movement of load base frame 220 (and any load placed on it and attached to it, if any) may be along linear axes $LIN_X$, $LIN_Y$, $LIN_Z$, and along rotational axes $ROT_{ROLL}$, $ROT_{YAW}$ and $ROT_{TURN}$, as indicated by the respective arrows in FIG. 2B. Vertical-only-free movement connecting means 215 may be adapted to enable free movement connection of load base frame 220 with respect to back frame 210 only in its $LIN_Z$ linear axis direction and provide substantially rigid connection of load base frame 220 to back frame 210 in all other five degrees of freedom. For example, due to the features of vertical-only-free movement connecting means 215, load base frame 220 (and as a result—the load that is secured to it, if any) will be secured to the user's upper part of the body in all five degrees of freedom except for freedom to move along $LIN_Z$ axis, at least along certain free traveling distance.

In order to enable load base frame 220 (and any load that is secured to it) to easily follow the movements of the user's body along the $ROT_{ROLL}$ rotational direction and to minimize undesired affect of changes in the lateral inclination of the ground surface at ground contact point GCP, the width $GCP_{WIDTH}$ of ground contact means 240 should be very small with respect to the distance between GCP and the connection of support means 230 to load base frame 220 $GCP\text{-}BASE_{DIST}$ so that when the lateral angle α between support means 230 and the ground surface at the GCP changes, for example due to local change in the face of ground or due to movement of the user, there will be negligible resulting sideways turning forces acting on system 200 and negligible change in the ground level acting on GCP. For example the width $GCP_{WIDTH}$ of ground contact means 240 may be kept smaller than 5% of $GCP\text{-}BASE_{DIST}$. According to embodiments of the present invention ground contact means 240 may be one or more (two, three, etc.) wheels or rollers preferably with a common rolling axis, as long as their overall $GCP_{WIDTH}$ complies with the requirement described above. Alternatively ground contact means 240 may be adapted for movement on other types of ground surfaces, for example snow skate board for traversing ground covered with snow, ice skate for traversing area covered by ice, etc., as is explained in details herein below.

According to embodiments of the present invention vertical-only-free movement connecting means 215 may be formed, for example, as a parallelograms-based connection between back frame 210 and load base frame 220. Alternatively, vertical-only-free movement connecting means 215 may be realized by one or more pairs of matching rails which allow vertical movement between back frame 210 and load frame 220, as indicated by double-headed arrow AR2 (FIG. 2A), while providing steady mechanical engagement of load base frame 220 to back frame 210 in all other degrees of freedom.

Reference is made now to FIG. 2C, which is schematic illustration of system 20 for carrying loads according to embodiments of the present invention. System 20 is shown in FIG. 2C from a side view however it will be noted that elements described below and depicted in FIG. 2C as flat elements, represent 3D element having the general shape of a frame the side of which is shown in FIG. 2C. For example, elements 22, 23, 24, 26 and to some extent element 28. System 20 comprise harness 22, back frame 23, harness vertical-only free movement connecting means 24, load base 26, load support 28 and gliding means 29. Harness 22 allows wearing and attaching system 20 onto human (or user) 12, similarly to harness 206 (FIG. 2A). Load base 26 allows attaching a load (not shown) to system 20. Attaching a load to load base 26 may use any known attachment means, such as belts, buckles and the like. Vertical-only free movement means 24 enables load base 26 to move freely with respect to harness back frame 23, in a substantially vertical direction substantially as indicated by two-headed arrow AR3 drawn on load base 26, at least along a specified free travel distance $D_T$, as exemplified by two edges A, A' drawn in dashed lines, which indicate the two respective maximal traveling way of load base 26 with respect to back frame 23. The movement of load base 26 up or down with respect to back frame 23 may be done without transmitting or transferring vertical loads from load base 26 to back frame 23 and harness 22, at least as long as the movement of load base 26 is within the free movement range $D_T$.

Load support means 28 may be located with respect to load base 26 so that when a load is attached to load base 26 its center of gravity (C.G.) will be located substantially above the connection of load support means 28 to load base 26. Load support 28 may comprise means for adjusting system 20 for the specific height of a user, e.g. by adjusting the total length of load support 28 as is explained below, so that when a user stands on a level and straight ground gliding means 30 touches that ground and load base 26 is substantially in the middle of travel distance $D_T$. Load support and adjusting means 28 having an upper and a lower end, which may comprise two parts, 28A proximal to the upper end and 28B proximal to the lower end, built, for example, as telescopic tubes that may glide in a fitted manner inside one another and may be fixed to each other at a desired position, to accomplish the required height adjustment of system 20 with respect to the ground as may be required by a specific user. Gliding means 29 may be adapted for the conditions of the environment where a user2 travels. When the user travels on hard ground gliding means 29 may be a roller or a wheel with bearing that provides smooth forward/backward gliding and when the user travels on ice gliding means 30 may be an ice skate, and the like. As described hereinabove the width of the contact area of gliding means 29 with the ground (measured in FIG. 2C in a direction perpendicular to the page) should be very small with respect to the distance of the load connection of load support 28 to load base 26 from the ground, and preferably not higher than 5% of this length. Gliding means 29 may comprise, when traveling on a ground, one or more wheels connected on a common axis 29A, the one or more wheels 29, or other gliding means (ice skate, snow board) should comply with the width requirement described above. According to additional or alternative embodiment, when ice skate is used that requirement is complied with according to the nature of an ice skate and when a snow board is used, its connection to support means 28 may comprise a flexible joint (not shown) which provides vertical stable connection of vertical support means 28 to gliding means 29 while allowing free sideways and forward/backward tilting between support means 28 and gliding means 29. In this embodiment the width of gliding means 29 may have less importance and it could be larger than the width defined above without interfering with the operation of system 20.

Momentary and local changes in the level of the ground surface on which a user walks with respect to the level on which gliding means 30 leans may be compensated by the free vertical movement of load base 26 with respect to harness 22 and back frame 23 so that as long as load base 26 travels freely within travel distance $D_T$ substantially no vertical load is supported by the user, except for the weight of harness 22 and back frame 23. A user provides stabilizing forces to system 20 (and a load attached to it, if any), via harness 22, back frame 23 and load base 26, to stabilize it in all degrees of freedom except for vertical movements along $LIN_Z$ axis, so that system 20 actually follows the movement or position of the back of the user in all degrees of freedom except for the vertical movements.

Load support adjusting means 28 may further be adapted to fold backwards with respect to the direction of human 12 front, in a circular movement indicated by two-headed arc arrow ARC1 about axis 28C, as will be explained in details herein below. Folding of support adjusting means 28 backwards may be required for accommodating with sudden and exceptional protrusions under gliding means 30 or when human 12 lowers for a while such as when human 12 kneels down. Folding of support adjusting means 28 backwards may be required also for folding the support when not in use to minimize the occupied volume of system 20 and enhance the mobility of the user.

Reference is made now to FIG. 3, which is a schematic isometric illustration of system 30 for carrying loads according to embodiments of the present invention. System 30 comprises back frame 33 adapted to be connected to a carrying harness (not shown) for attaching system 30 on a human's back. System 30 may further comprise load base 36 formed as a light weight L shaped (e.g. from a side view) 3D frame, four hinged connectors 34 forming, together with back frame 33 and with the upper part of load base 36 a spatial parallelogram which allows free vertical motion of load base 36 with respect to back frame 33, as indicated by the double headed arrow AR4. It will be apparent that load base 36 may be connected to back frame 33 in many other ways, such as one or more sliding pairs of rails or other sliding or free-movement means known in the art, which provide to load base 36 freedom of relative movement along the vertical linear axis and stability with respect to back frame 33 in all other degrees of freedom. System 30 may further comprise vertical load support 38, which may be realized by two or more telescopic tubes which are adjustable as explained above with respect to support means 28 of FIG. 2C. System 30 may further comprise first folding assembly for enabling momentary folding of load support 38 comprising momentary folding axis 52 about which load support 38 may turn in the direction indicated by arc arrow ARC2 and returning assembly 54 adapted to return load support 38 to its rest position when folding force is removed. System 30 may further comprise second folding assembly for enabling stowing/folding load support 38 when needed, comprising stowing/folding axis 62, stowing/folding handle 64 and handle securing means 66. Stowing/folding handle 64 is presented in FIG. 3 in its secured operational position. When handle 64 is released from secure means 66 it may be used to turn load support means 38 according to the indication of arrow ARC3 to substantially upright position. According to embodiments of the present invention load support 38 may be secured in its stowing upright position by folding handle 64 about its axis 68 forming about 180° of movement and re-securing it by secure means 66 in the folded up position (not shown in this drawing). It would be apparent to those skilled in the art that load support means 38 may be folded in other directions, for example—sideway, in order to enable placing support means 38 away from the ground. The specific embodiment may be selected to suit the specific needs and constraints.

Figures 4A, 4B, 4C, 4D:
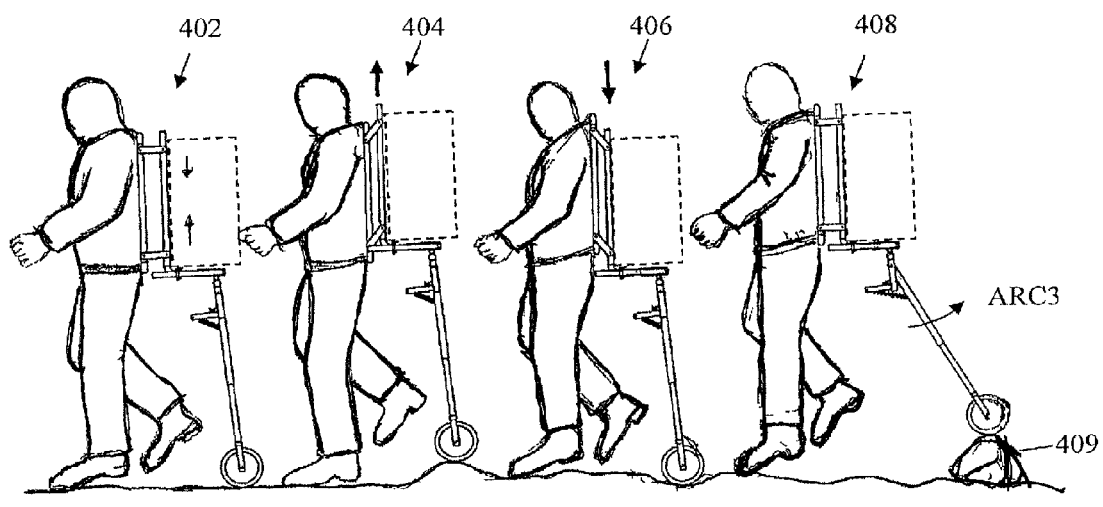
FIGS. 4A-4D schematically present loads carrying systems according to embodiments of the present invention in different states.

Reference is made now to FIGS. 4A-4D, which schematically present loads carrying systems 402, 404, 406 and 408 each in a different use situations, according to embodiments of the present invention. Load carrying system 402 of FIG. 4A is presented in a state where the level of the ground under the user of system 402 is substantially at the same as the level of the ground under the load support. As is depicted the load base of part of system 402 is substantially in the middle of its free vertical way and is able to freely move up and down within this free way. Load carrying system 404 of FIG. 4B presents a state where its load support leans on a protrusion on the ground and therefore moves up with respect to the user however system 404 load base is still within the free vertical movement range. As long as the load base is free to move up, the vertical movement of load support will have minimal or no effect on the user. As depicted in FIG. 4C load carrying system 406 presents a state where the load support hits a local depression in the ground, which causes the load base to move downwards with respect to the user, still within its free vertical movement range. As long as the load base is free to move down, the vertical movement of the load support will have minimal or no effect on the user. FIG. 4D presents a state where during walking of the human the load support hits a sudden high obstacle 409, which activates a folding force on the load support, causing it to fold backwards in the direction indicated by the arc arrow ARC3, against the returning force of the returning mechanism, as described, for example, with respect to FIG. 3. When the human walks a bit further forward and the load support and its gliding means pass obstacle 409 the load support will be free to straighten down wards to its unfolded position.

Figure 5:
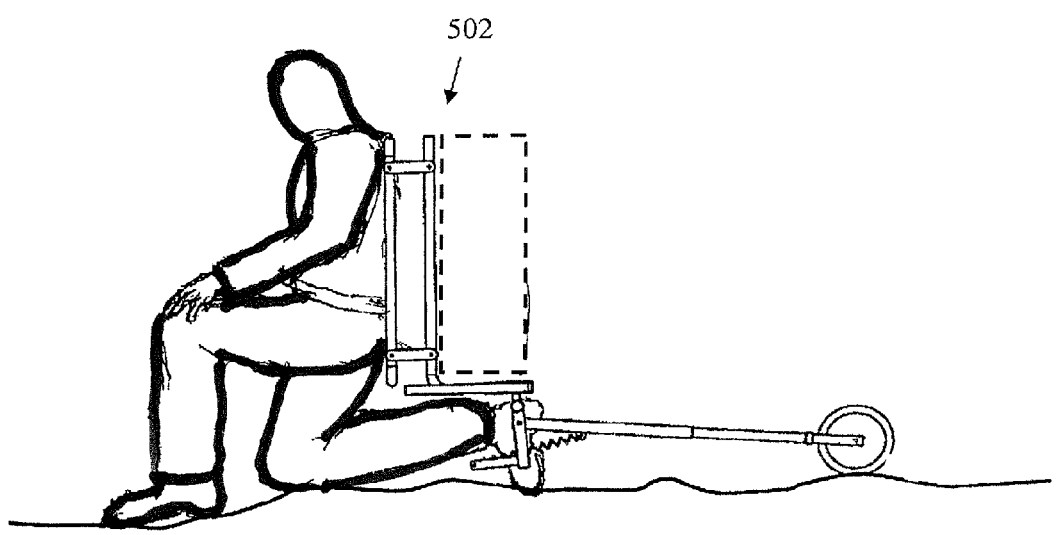
FIG. 5 schematically presents a load carrying system in a kneel-down state, according to embodiments the present invention.

Reference is made now to FIG. 5, which schematically illustrates load carrying system 502 in a kneel-down state, according to embodiments the present invention. As depicted, when the user of system 502 needs to kneel down (or otherwise bend down) the load support may fold, for example, backwards, optionally against a returning mechanism so that when the user stands up the load support straighten downwards to its supporting, unfolded position. Other folding arrangements of the load support may be realized, according to other embodiments of the present invention, for example folding sideways, or collapsing of the load support into itself (e.g. when arranged as a telescopic set of tubes with a collapsing enable/disable mechanism to enable the human control of the collapsing action).

Reference is made now to FIG. 6, which illustrates load carrying system 602 according to embodiments of the present invention in its stowed/folded state, where the load support is taken away from the ground, for example folded up, for example for simplifying the walking in an exceptionally harsh terrain, or for occupying less volume or for any other purpose. The folding of load support in this way is explained in more details with respect to FIG. 3. It would be apparent to one skilled in the art that according to other embodiments of the present invention other stowing/folding embodiments may be realized as part within the scope of the present invention, such as folding the load support means upwardly via one of the sides, or inserting the load support means upwardly via a leading tube-like structure.

Figure 7:
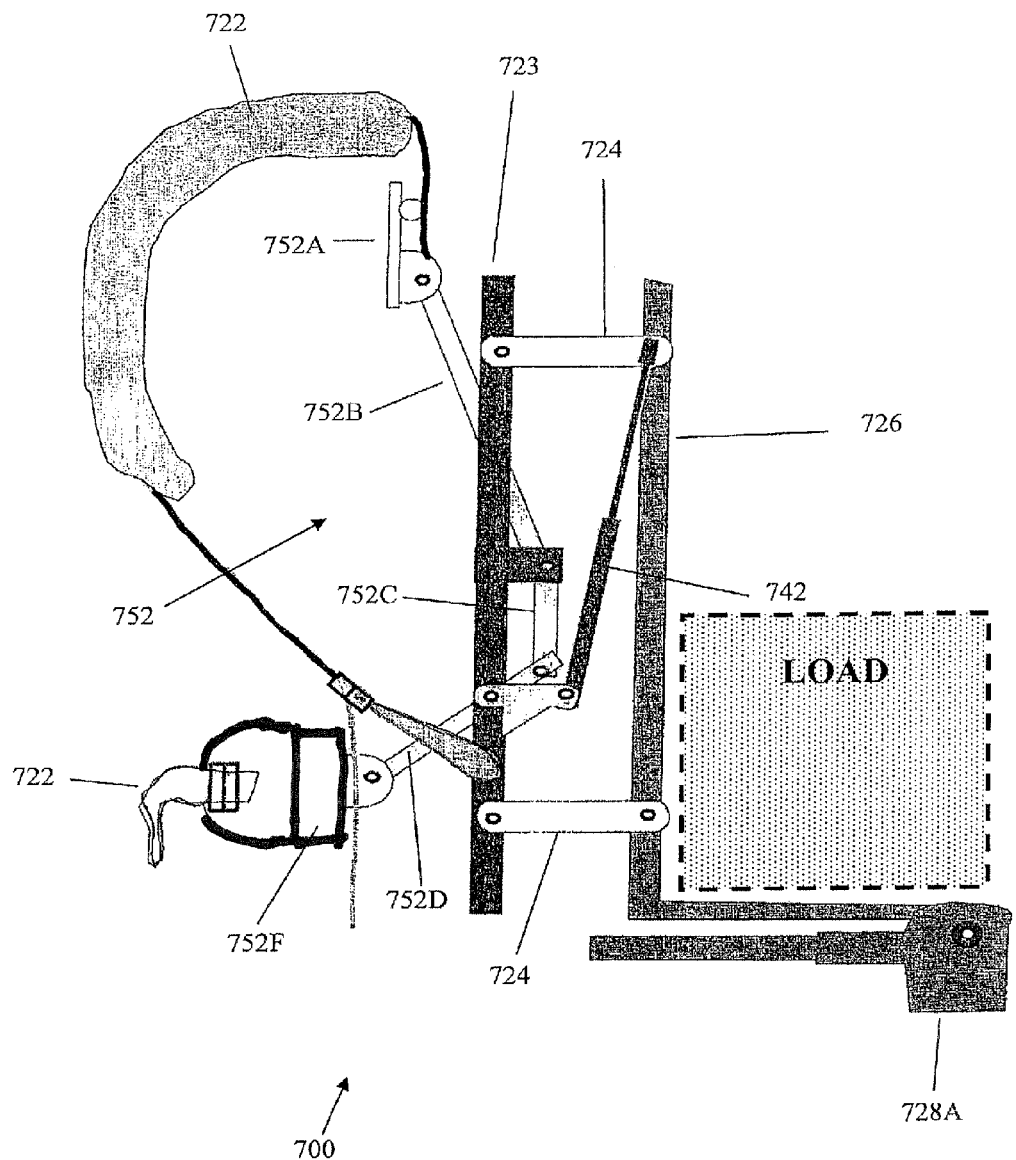
FIG. 7 is a schematic side view illustration of a system for carrying loads according to embodiments of the present invention.

Reference is made now to FIG. 7, which is a schematic side view illustration of system 700 for carrying loads according to embodiments of the present invention. System 700 may comprise harness 722, harness back frame 723, free movement means 724a and load base 726, which function similar to their respective elements in FIG. 2C and the description of those respective elements of FIG. 2C is applicable here also. System 700 further comprise shock absorber/load balancer device 742, which may be connected between harness back 723 and load base 726 so that when harness back 723 and load base 726 move with respect to each other extension/contraction forces are exerted along device 742. Device 742 may comprise a spring that is configured to act against contraction forces and thus to provide supporting force to load base 726 when abrupt movement of load base 726 is forced. According to yet another embodiment of the present invention device 742 may comprise pneumatic or hydraulic shock absorber which may act as bumps restrainer. It shall be apparent to one skilled in the art that device 742 may be embodied differently from the description above and/or may be connected between harness back 723 and load base 726 differently than the description above as long as supporting/restraining force is exerted to oppose or restrain relative movements between harness back 723 and load base 726.

Figure 8:
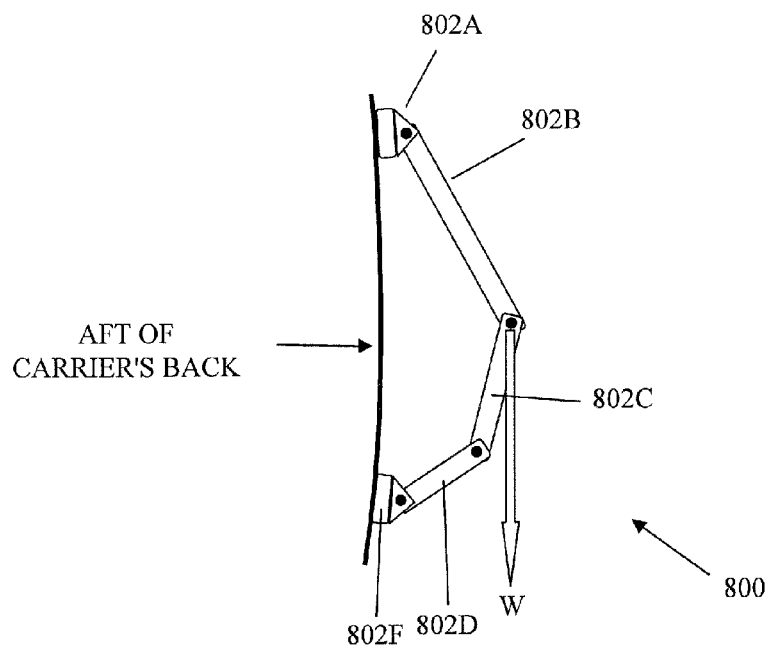
FIG. 8 is a schematic simplified illustration of a flexible assembly for providing flexible connection of a carrying system to a body of a user according to embodiments of the present invention.
Figure 9A:
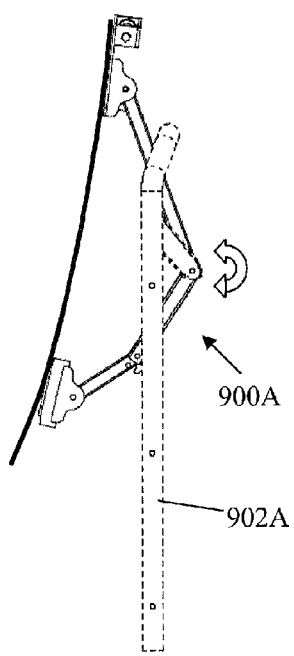
FIGS. 9A, 9B and 9C depict a flexible assembly in 3 different positions according to embodiments of the present invention.
Figure 9B:
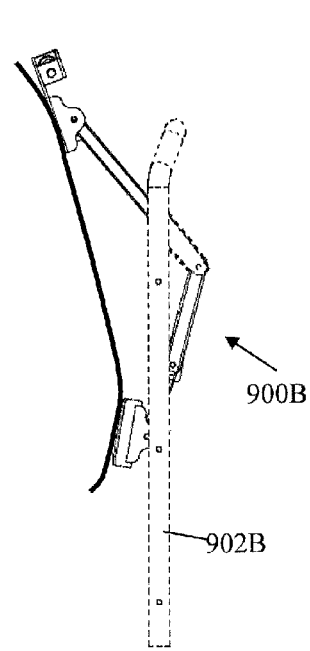
Figure 9C:
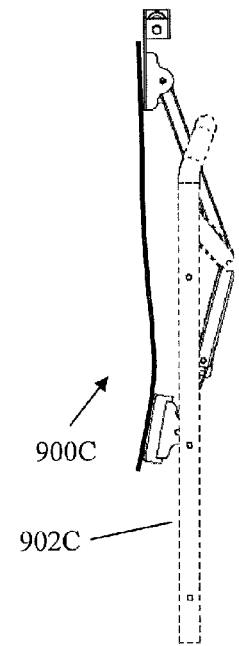

System 700 may further comprise flexible assembly 752, to enable natural movements of the back of a user of system 700 including leaning forward and backward, as may be required due to changing road conditions and slopes. Assembly 752 may be configured as several links 752A, 752B, 752C, 752D and 752F hingeably connected in a row, where the hinges connecting each adjacent pair of links allow relative circular movement in the drawing plain. It will be noted that the actual structure of assembly 752 comprise a frame associated with each link 752A, 752B, 752C, 752D and 752F where each frame comprise two parallel links and at least one cross-connecting element to provide stability of the construction. Edge links 752A and 752F are configured to provide suitable interface with the respective upper and lower parts of the back of a user of system 700. The multi-links construction of assembly 752 provides high flexibility for movements of the user's back, in extreme positions such as leaning deep forward or backward. Kneeling, etc. Reference is made now to FIG. 8, which is a schematic simplified illustration of flexible assembly 800 for providing flexible connection of a carrying system to a body of a user, and to FIGS. 9A, 9B and 9C which depict a flexible assembly in 3 different positions 900A, 900B and 900C, respectively, according to embodiments of the present invention. Assembly 800 comprise several links 800A, 800B, 800C, 800D and 800F, connected in a row, where the hinges connecting each adjacent pair of links allow relative circular movement in the drawing plain and functions similarly to the functioning of assembly 752, as described above. Load of the payload portion of system for carrying loads may be connected to assembly 800 at any desired position so as to address the specific needs of the carried load and the load carrier. Typically, as described in FIG. 8, the pay load may be harnessed to assembly 800 at a linking point between two adjacent links, e.g. in the linking point between link 802B and link 802C, as depicted by the arrow drawn in FIG. 8 and marked "W". Assemblies 900A, 900B, 900C exemplify three different extreme positions of a user of system 700 (FIG. 7) including leaning deeply backwards, leaning deeply forward and straight up walking, respectively. The rotatable connection of the back portion of a load carrier of the present invention to assembly 800 using one axis enable high angular separation between the user who carries the load and the carried load. As may be seen in FIGS. 9A, 9B and 9C portion of back element 902A, 902B and 902C, respectively (drawn in broken line) maintain substantially upright orientation when assemblies 900A, 900B and 900C exercise extreme forward and backward leaning positions.

Figure 10A:
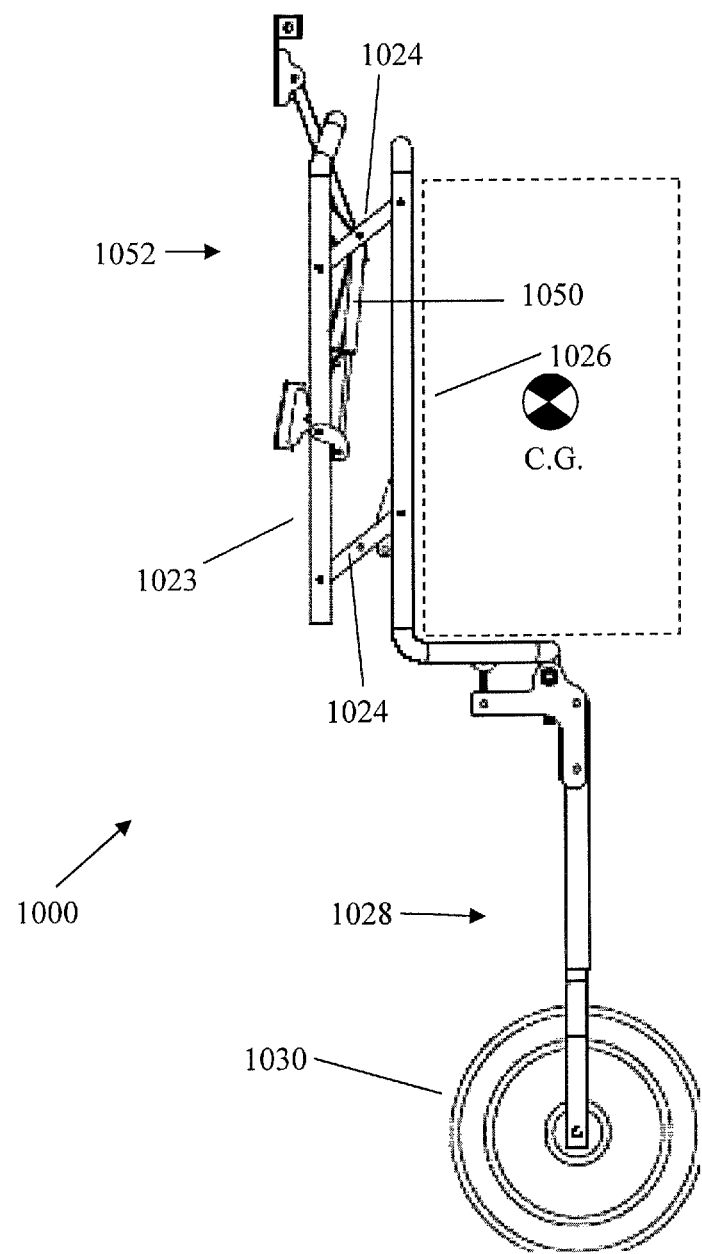
FIGS. 10A and 10B schematically illustrate side view and isometric view of a system comprising shock absorbing arrangement according to embodiments of the present invention.
Figure 10B:
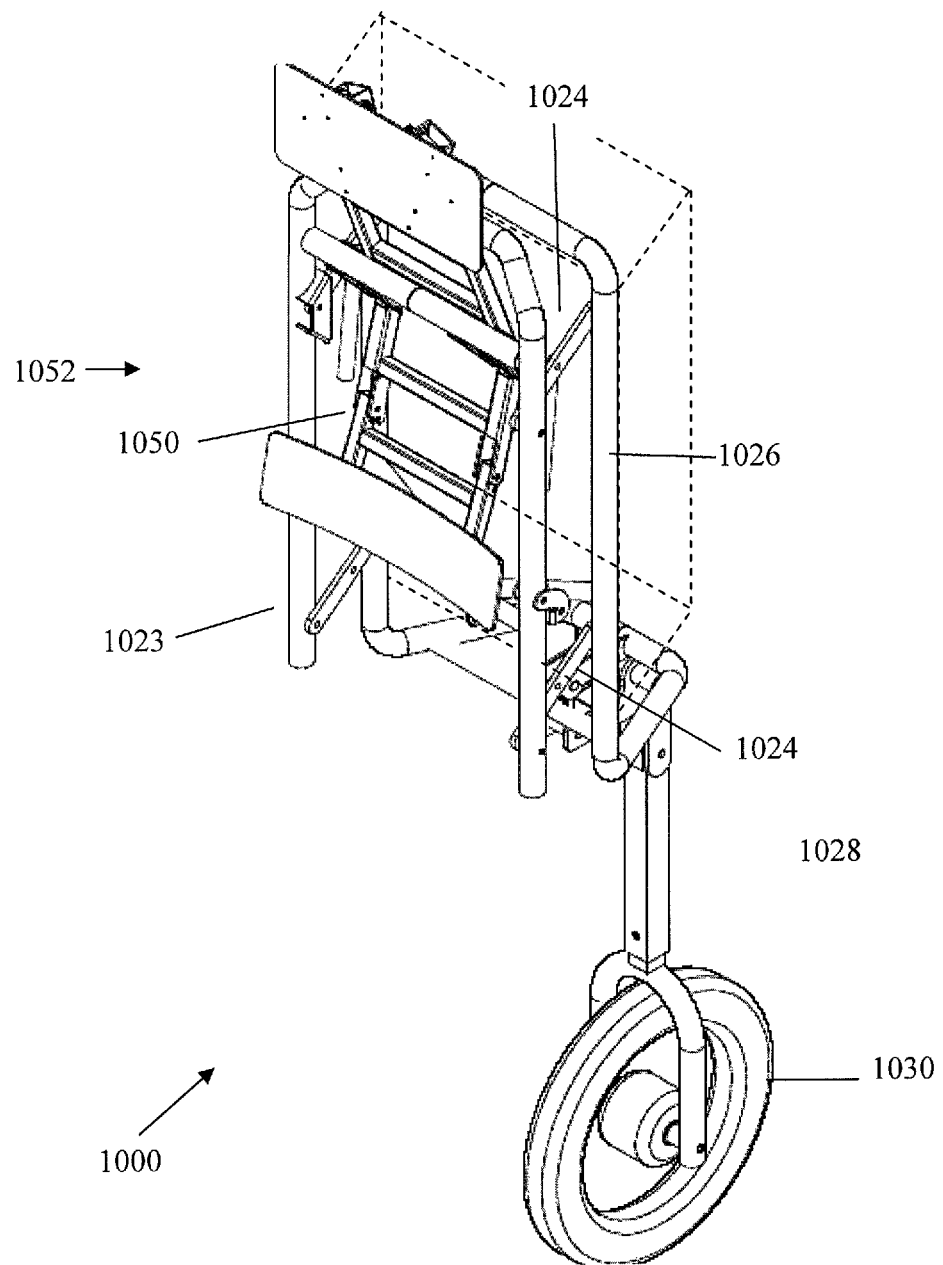

Reference is made now to FIGS. 10A and 10B which schematically illustrate side view and isometric view of system 1000 comprising shock absorbing arrangement according to embodiments of the present invention. System 1000 is adapted for carrying loads, such as system 700 (FIG. 7), and further comprising shock absorber/load balancer device 1050. Device 1050 functionally corresponds to shock absorber/load balancer device 742 (FIG. 7). System 1000 further comprising flexible assembly 1052 for providing flexible connection of system 1000 to the body of a user, which functionally corresponds to flexible assembly 752.

Figure 11A:
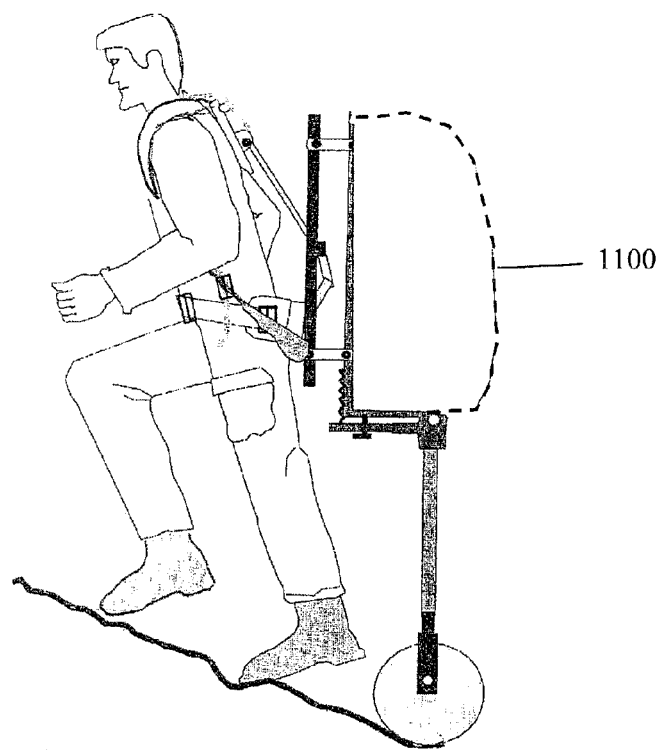
FIGS. 11A and 11B schematically illustrate the operation of a flexible connecting assembly in extreme forward or backwards leaning positions of the user respectively, according to embodiments of the present invention It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.
Figure 11B:
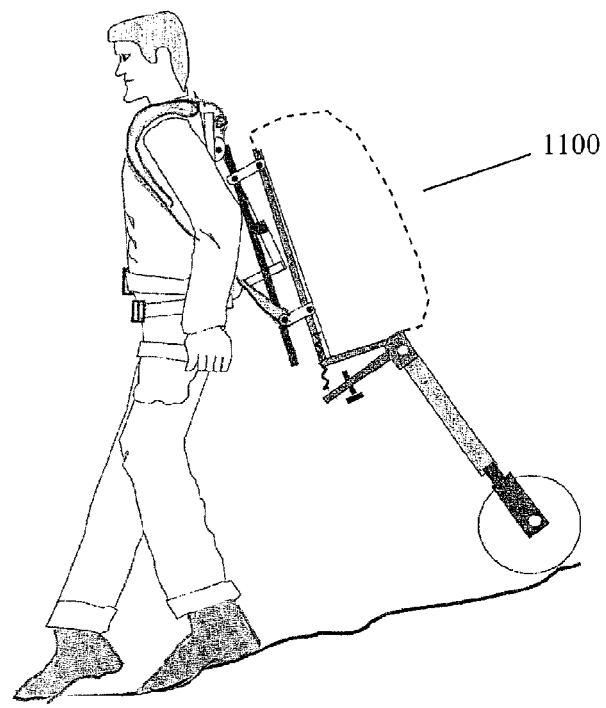

Reference is made now to FIGS. 11A and 11B which schematically illustrate the operation of flexible connecting assembly 1050 (or one similar to it) in extreme forward or backwards leaning positions of the user, respectively, according to embodiments of the present invention, so that its load 1100 remains substantially upright and allow for enough freedom for the user to lean forward/backward as may be required.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for carrying loads comprising:
   a harness;
   a back frame;
   a load base;
   vertical-only-free movement connecting means to connect said load base to said back frame so that said load base can move freely with respect to said back frame along one linear axis within a defined range substantially without transmitting vertical load onto said back frame and be steadily connected to said back frame in the other two linear axes and in the three rotational axes;
   load support and adjusting means having upper end and lower end to support said load base from below, said load supporting means is connected to said load base at a location so that when a load is attached onto said load base its center of gravity is substantially vertically above said connection point when said system is in use; and
   gliding means connected to the lower end of said support and adjusting means, to enable easy gliding of said system on the ground when in touch with the ground;
   wherein said load support and adjusting means further comprise:
      a first folding means to allow temporary backward rotation of said load support and adjusting means in response to bumping of said gliding means into a local protrusion on the ground, said rotation is returnable by retuning means; and
      a second folding means to allow folding of said load support and adjusting means upwardly to a stowing position.

2. The system of claim 1, wherein said means to connect said back frame to said load base is at least one from a list including a parallelogram and at least one sliding rail.

3. The system of claim 1, wherein said load support and adjusting means comprise at least two telescopic tubes that are adapted to glide in a fitted manner inside one another and adapted to be fixed to each other at a desired position.

4. The system of claim 1, wherein said harness comprises at least two links pivotally connected to each other to allow relative rotational movement of one link with respect to the other in a plane vertical to the ground when said system is carried by a user standing upright and parallel to said load support and adjusting means, to allow flexibility of said back frame when said user leans forward.

5. The system of claim 1, further comprising shock restraining means connected between said back frame and said load base to restrain abrupt vertical movements of said load base with respect to said back frame.

6. A method for carrying loads comprising:
   attaching a back frame to a load base by means allowing vertical-only-free movement of said load base with respect to said back frame within a defined range substantially without transmitting vertical load onto said back frame;
   supporting said load base with respect to the ground by means of an adjustable load support and gliding means, said load support is connected to said load base at a location so that when a load is attached onto said load base its center of gravity is substantially vertically above said connection point when said system is in use and wherein said adjustable load support comprises a first folding means to allow temporary backward rotation of said adjustable load support in response to bumping of said gliding means into a local protrusion on the ground, said rotation is returnable by returning means; and a second folding means to allow folding of said adjustable load support upwardly to a stowing position;
   loading a load onto said load base; and
   attaching said back frame to a back of a user by means of a harness attached to said back frame.

7. The method of claim 6 further comprising:
   restraining the movement of said load base with respect to back frame by means of restraining means connected between them.

8. A system for carrying loads, the system and comprising:
   a harness adapted to be worn by a user;
   a harness back frame attached to the harness and having a vertical axis;
   a load base comprising a base portion configured for receiving a load thereon, the base portion being oriented transversely to the vertical axis;
   connecting means connecting said base portion to said back frame so as to allow free movement of said base portion parallel to itself, with respect to said back frame, along the vertical axis;
   load support disposed under the base portion and having an upper end connected to the base portion and an opposite, lower end associated with gliding means configured for gliding when in touch with the ground, the load support being configured to provide vertical support to the base portion and while doing so to move along the vertical axis in response to the topography of the ground, causing thereby the load base to perform its corresponding movement parallel to itself along the vertical axis;

wherein said load support comprises a first folding means to allow temporary backward rotation of said load support in response to bumping of said gliding means into a local protrusion on the ground, said rotation is returnable by returning means; and a second folding means to allow folding of said load support upwardly to a stowing position.

9. A system according to claim 8, wherein the load base further comprises a vertically oriented side portion holding the base portion fixed thereto to form an integral body or formed as an unitary body therewith, and said connecting means connect the side portion with the back frame so as to allow the movement of the side portion together with the base portion along the vertical axis.

10. A system according to claim 9, wherein at least a part of the side portion extends along the back frame and is disposed above the base portion.

11. A system according to claim 10, wherein the load base is configured to perform said movement between an raised position in which the load support exerts on the base portion an upward force, and a lowered position taken by the load base under the influence of gravity.

12. A system according to claim 10, wherein, in the side view of the frame, said part of the side portion extends along at least a majority of the back frame in at least one of said positions or in at least one intermediate position between the raised and the raised positions.

13. A system according to claim 8, wherein in the side view of the system an angle between the base portion and the back frame does not exceed 90 deg.

14. A system according to claim 9, wherein in the side view of the system, the side portion is parallel to the back frame.

15. A system according to claim 9, wherein said means connecting the side portion of the load base to the back frame are in the form of one of the following:
  (a) a sliding device and a receiving device, of which one is fixed to the side portion or formed integrally therewith, and the other one is fixed to the back frame or formed integrally therewith, and means allowing the sliding device to freely slide within the receiving device to allow the movement of the load base with respect to the back frame; and
  (b) at least four parallel hinged connectors extending between the back frame and the side portion of the load base and forming therewith a parallelogram movement mechanism.

16. A system according to claim 8, wherein the load support is configured for taking at least two states defined by different positions of at least the lower end of the load support relative to the base portion of the load base, at least one of said states allowing the load support to provide said vertical support to the base portion of the load base.

17. A system according to claim 16, wherein said load support has an upper portion associated with its upper end, and a lower portion associated with its lower end and movable with respect to the upper portion to bring the load support from one of said states to another.

18. A system according to claim 16, wherein said different states are defined by different positions of the lower end relative to the upper end.

19. A system according to claim 16, wherein said different states are defined by different distances between the upper and lower ends of the load support.

20. A system according to claim 16, wherein said different states are defined by different distances of the lower end from the vertical axis of the system.

21. A system according to claim 17, wherein the movable portion of the load support is configured for taking different angular positions relative to the vertical axis of the system, at least one of said positions being vertical.

22. A system according to claim 8, wherein the load support is configured to take at least one working position in which it is configured to proved said vertical support to the base portion of the load base, and a non-working, stored position at which it is prevented from providing such support.

23. A system according to claim 22, wherein in said stored position, one of the following conditions is met:
  the lower support is disposed below the base portion of the load base and has a shorter length than that in the working position and/or is oriented at such acute angle relative to the base portion, as to prevent the load support from contacting the ground;
  the load support is oriented perpendicular to the vertical axis of the system;
  the load support extends upwardly from the base portion of the load base; and
  the load support is detached from the base portion with a possibility of being attached back thereto.

* * * * *